No. 787,292. PATENTED APR. 11, 1905.
T. B. HATCH.
DYNAMO ELECTRIC MACHINE.
APPLICATION FILED MAR. 7, 1904.
2 SHEETS—SHEET 1.
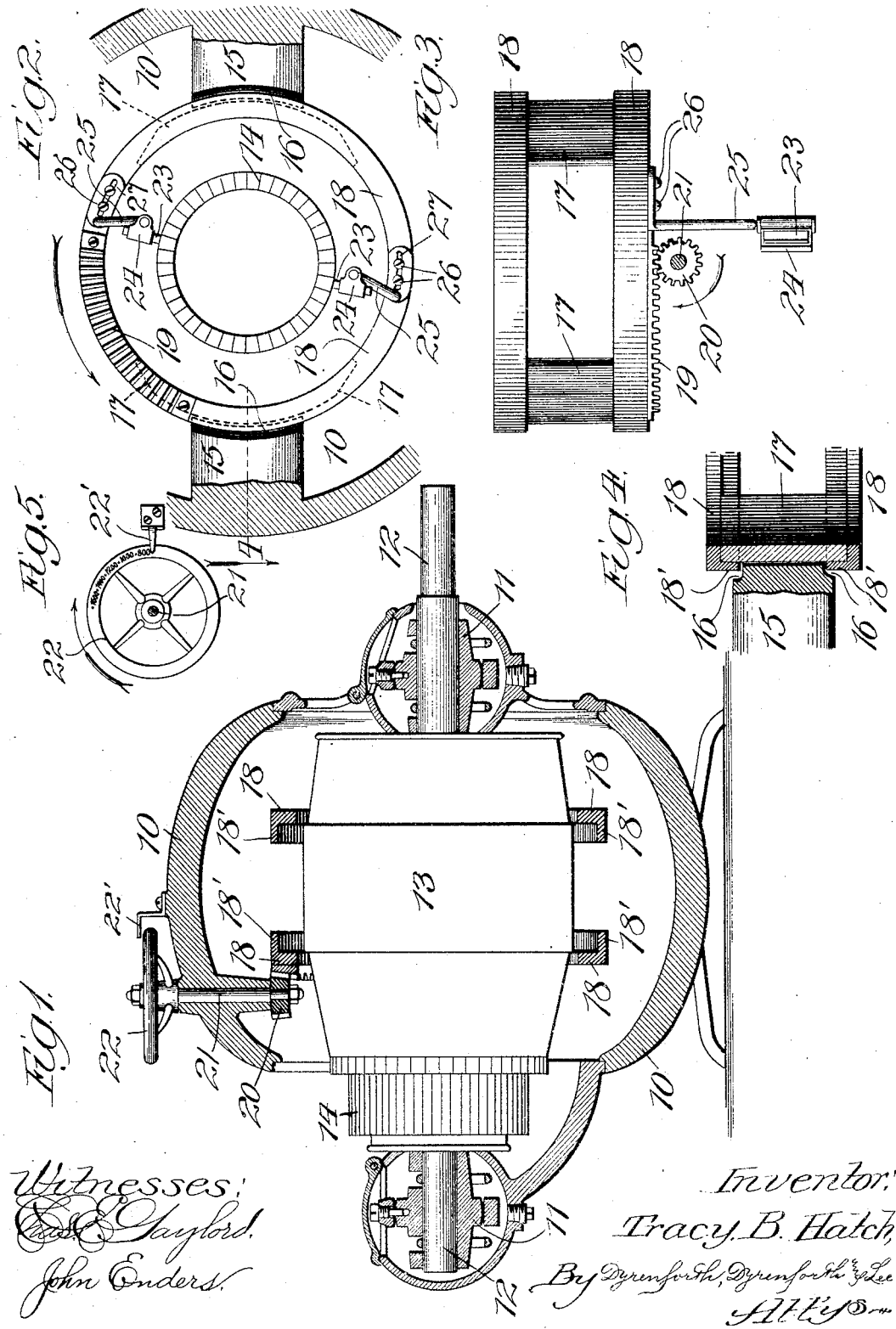
Witnesses:
Chas. E. Gaylord.
John Enders.
Inventor:
Tracy B. Hatch,
By Dyrenforth, Dyrenforth & Lee
Attys.

No. 787,292. PATENTED APR. 11, 1905.
T. B. HATCH.
DYNAMO ELECTRIC MACHINE.
APPLICATION FILED MAR. 7, 1904.
2 SHEETS—SHEET 2.
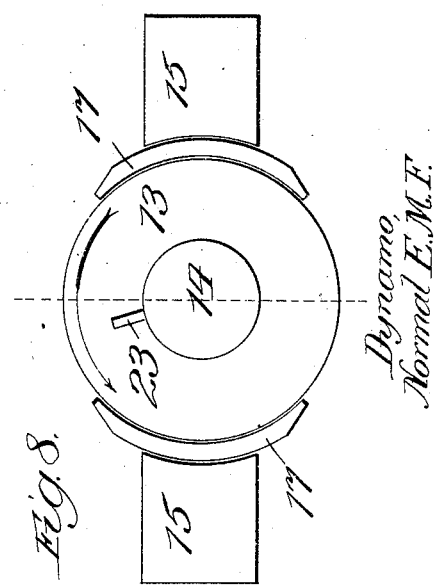
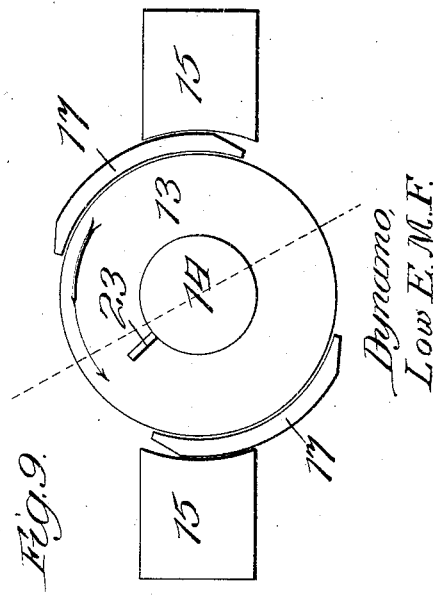
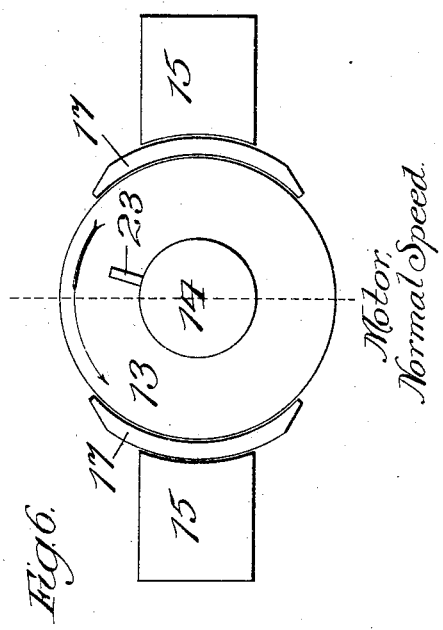
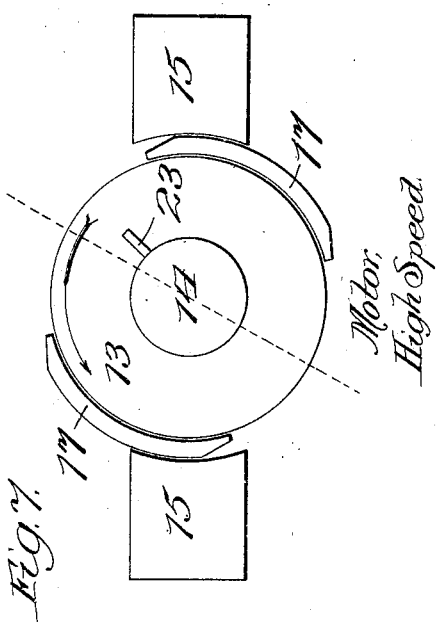
Witnesses:
Inventor:
Tracy B. Hatch, No. 787,292.

Patented April 11, 1905.

UNITED STATES PATENT OFFICE.

TRACY B. HATCH, OF LOS ANGELES, CALIFORNIA.

DYNAMO-ELECTRIC MACHINE.

SPECIFICATION forming part of Letters Patent No. 787,292, dated April 11, 1905.

Application filed March 7, 1904. Serial No. 196,842.

*To all whom it may concern:*

Be it known that I, TRACY BARBOUR HATCH, a citizen of the United States, residing at Los Angeles, in the county of Los Angeles and State of California, have invented a new and useful Improvement in Dynamo-Electric Machines, of which the following is a specification.

My invention relates to dynamo-electric machines, and has for one of its salient objects to provide a means whereby the stable working of the machine may be maintained throughout a wide range of its operation.

My invention has for a further object to increase the range of operation of such machines and to preserve the characteristics of normal operation at all points within the range of adjustment of the machine.

With a view to attaining these and other ends, which will become apparent to those skilled in the art, my invention, broadly considered, consists in the provision in a dynamo-electric machine of means for varying the physical arrangement of the field-magnet to vary the effective area of the magnetic field, with reference to its action upon the armature, for the purpose of varying the speed of the machine, and correspondingly adjusting the commutating device.

My invention further consists in the provision, in a direct-current dynamo-electric machine wherein the effective area of the magnetic field is variable, as above set forth, of a means for moving the collecting-brushes of the armature simultaneously and consistently with said variation of the effective field area to preserve the stability of operation of the machine and insure sparkless commutation.

My invention further consists in the features of construction and arrangement of parts hereinafter more fully described, and specified in the claims.

In the drawings, wherein I have illustrated an operative embodiment of my invention in a direct-current dynamo-electric machine, Figure 1 is a longitudinal vertical section of the machine, showing the armature in elevation. Fig. 2 is an end view of the interior elements of the machine. Fig. 3 is a top plan view of parts shown in Fig. 2. Fig. 4 is a fragmentary vertical section on line 4 4 of Fig. 2. Fig. 5 is a detail plan view of the adjusting hand-wheel and indicator shown in elevation in Fig. 1. Figs. 6, 7, 8, and 9 are diagrammatic views illustrating conditions of operation of dynamo-electric machines constructed in accordance with my invention.

Throughout the drawings like numerals of reference refer always to like parts.

Referring now to the drawings, 10 indicates the casing of a dynamo-electric machine of any suitable design, provided at its opposite ends with suitable bearing structures 11 11, arranged to afford bearing-support to the armature-shaft 12.

13 indicates an armature of any suitable construction and 14 a commutator therefor, both carried by the shaft 12.

15 15 indicate the pole-piece cores of the field-magnets, which project from the casing to distances suitably removed from the periphery of the armature and are provided at their inner ends with recesses 16 16, extending in a direction circumferential to said armature. The purpose of these recesses will later become apparent.

The dynamo-electric machine may be of any desired number of poles, that herein illustrated being for simplicity shown as a bipolar machine.

17 17 indicate pole-shoes associated with the respective pole-cores 15 15 for movement relative thereto in direction circumferential relative to the armature. In the specified construction shown the shoes 17 17 are rigidly secured to two concentric diamagnetic rings 18 18, having inturned flanges 18' 18' overlying the exterior face of the pole-shoes and projecting into the corresponding recesses 16 16 of the stationary pole-cores 15, as best illustrated in Fig. 4. The parts are preferably so proportioned that the movable shoes and their carrying-rings neatly interfit with the proximate faces of the stationary pole-cores so that the entire movable structure receives support from said pole-cores. A means is provided for rotatably adjusting the movable structure to move the shoes circumferentially relative to the armature, such means in the present instance comprising a segmental rack 19, mounted upon one of the rings 18 and meshing with a spur-gear 20, arranged within the casing and carried by a shaft 21. The shaft 21 projects through the casing and is provided at its outer end with a suitable hand-wheel 22 or equivalent device. A pointer or index 22' may, if desired, be mounted on the casing adjacent to said wheel for a purpose to be described.

23 23 indicate the collecting-brushes, arranged in contact with the commutator 14. These brushes are arranged for circumferential movement relative to the commutator simultaneously and consistently with the movement of the pole. Any suitable means may obviously be employed to effect such movement of the brushes, but for simplicity I prefer to connect the brush-holders 24 directly with a diamagnetic ring 18 by arms 25, carrying the brush-holders and adjustably secured to the ring 18, as by bolts 26, passing through suitable slots 27 in the flaring bases of the said arms.

It will now be apparent that the pole-shoes 17 and the brushes 25 will be simultaneously and coincidently moved by the operation of the hand-wheel or operating member 22. Preferably the arrangement is such that when the gear 20 is in the center of the rack 19 the adjustable shoes and the brushes occupy relative to the armature and commutator the positions illustrated in Fig. 2. Preferably also the cross-sectional area of the adjustable shoes is such that when in the position of registration with the cores illustrated in Fig. 2 they are magnetically saturated. The physical effect of the adjustment of the pole-shoes 17 relative to their stationary pole-cores and the armature is to vary the speed of rotation of the machine. The simultaneous and consistent adjustment of the brushes maintains the stability of operation of the machine throughout its various speed adjustments and provides for sparkless commutation by varying the lead of the diameter of commutation to compensate for the alteration of magnetic conditions due to the variations of speed.

It will be apparent that my device may be operated either as a dynamo or a motor, the brushes being adjusted on the ring 18 to secure the usual lead in a proper direction.

In Figs. 6 and 7, respectively, I have illustrated diagrammatically the operation of a machine when running as a motor at normal and at high speed, and in Figs. 8 and 9 have similarly illustrated the operation of the machine as a dynamo.

Theoretically the strength of any magnetic field is measured by the number of imaginary lines of magnetic force that flow through any given sectional area thereof or, in other words, by the density of the magnetic lines of force. It will be apparent that the adjustment of the pole-shoes from their normal positions of central registration with their stationary cores will reduce the effective area of the magnetic field with reference to its action upon the armature; but it is my theory that the density of the magnetic lines of force in that portion of the shoe remaining under the magnetic pole is not varied by such adjustment. It follows, therefore, that undue distortion of the lines of force from the weakening of the field will not occur in my machine. The reduction of the effective area of the field, however, by reducing the number of theoretical lines of force cut by the armature increases the speed of rotation of the armature, as will be well understood, thereby changing the rearward or forward lead of the true diameter of commutation relative to the theoretical diameter of commutation, according as the machine is run as a motor or a dynamo. This variation, which I have found in practice is substantially proportional to the change of position of the pole-shoes, is compensated for by the simultaneous consistent movement of the commutator brushes in a direction corresponding with the direction of adjustment of the pole-shoes, thus insuring sparkless commutation at any speed within the range of adjustment of the machine.

The arrangement illustrated in Figs. 2 and 5 is that provided when the machine is to be used as a motor, and the adjustment of the hand-wheel in the direction of movement of a clock-hand moves the shoes and brushes rearwardly with reference to the direction of rotation of the armature. (Indicated by the arrow.) If desired, the hand-wheel may be provided with speed-indicating numerals upon its periphery and the index-finger 22' properly positioned to coact with said wheel to indicate approximately the speed at which the motor is operating at any time.

While I have herein indicated a single operating means for accomplishing the adjustment of both of the pole-shoes and the brushes, it will be apparent that such elements might be made independently adjustable, and I therefore desire to be understood as employing the terms "agencies for varying the effective magnetic area of the field-magnet and adjusting the commutator device," or equivalent words, as contemplating either single or independent means for accomplishing the two results set forth.

While I have herein described in some detail the specific embodiment of my invention, it will be apparent to those skilled in the art that it is susceptible to wide application and that numerous changes might be made therein without departing from the spirit and scope of my invention. While, therefore, I claim as my invention those features or structural novelty which I deem advantageous or important, I do not desire to be understood as limiting the broad claims of my invention to the construction shown.

Having thus described my invention, what I claim, and desire to secure by Letters Patent of the United States, is—

1. In a dynamo-electric machine, the combination of an armature, a commutating device, a field-magnet pole having a movable part, and agencies for varying the position of the movable part of said pole to vary its effective magnetic area, and adjusting the commutating device.

2. In a dynamo-electric machine, the combination of an armature, a commutating device, a field-magnet pole having a movable part, and agencies for varying the position of the movable part of said pole to vary its effective magnetic area, and simultaneously adjusting said commutating device.

3. In a dynamo-electric machine, the combination of an armature, a commutating device, a field-magnet, and agencies for adjusting a portion of the field-magnet circumferentially relative to the armature to vary its effective area, and adjusting the commutating device.

4. In a dynamo-electric machine, the combination of an armature, collecting-brushes therefor, a field-magnet pole having a movable part, and agencies for varying the position of said movable part of said field-magnet pole to vary the effective magnetic area of said field-magnet, and simultaneously moving the collecting-brushes consistently therewith.

5. In a dynamo-electric machine, the combination of an armature, a field-magnet pole having a movable part, a commutating device, and agencies for varying the position of the movable part of the field-magnet pole to vary the effective magnetic area of said field-magnet, and simultaneously adjusting the commutating devices, said agencies comprising a single operating member.

6. In a dynamo-electric machine, the combination of an armature, a commutating device, a field-magnet having a pole part movable to vary its effective magnetic area, and agencies for moving said part and adjusting the commutating device.

7. In a dynamo-electric machine, the combination of an armature, a commutating device, a field-magnet comprising pole-shoes adjustable circumferentially relative the armature, and agencies for adjusting said field-magnet pole-shoes and adjusting the commutating device.

8. In a dynamo-electric machine, confronting pole-cores, and a rotatable structure carrying adjustable pole-shoes, arranged to coact with said pole-cores and receive support therefrom.

9. In a dynamo-electric machine, confronting pole-cores, rotatably-adjustable pole-shoes, and a mechanical connection between said shoes, the shoes being arranged to receive support from the pole-cores.

10. In a dynamo-electric machine, an armature, a commutator, a field-magnet pole-core, a pole-shoe adjustable relative to its core, and a collecting-brush connected with the adjustable shoe for movement therewith.

TRACY B. HATCH.

In presence of—
WALTER N. WINBERG,
ALMA U. THOUEN.